June 7, 1955 — J. H. WAGGONER — 2,710,275
METHOD OF BULKING GLASS FIBER STRANDS
Filed May 1, 1951

INVENTOR.
Jack H. Waggoner
BY
ATTORNEYS

United States Patent Office 2,710,275
Patented June 7, 1955

2,710,275

METHOD OF BULKING GLASS FIBER STRANDS

Jack H. Waggoner, Newark, Ohio, assignor to Owens-Corning Fiberglas Corporation, a corporation of Delaware Application May 1, 1951, Serial No. 223,895

9 Claims. (Cl. 154—91)

This invention relates to a method of bulking glass fiber strands in order to cushion the glass fibers making up the strands from each other, to decrease the minimum radii through which the strands can turn without injury during knitting, weaving or other fabricating operations, and to increase the size of a strand containing a given number of glass fibers of a certain diameter.

Glass fiber strands which are used for textile purposes may consist of as many as 200 or more individual glass fibers each of which is so fine as to be almost invisible. The 200 or more glass fibers are loosely associated in a continuous strand which then has approximately the bulk of a relatively fine textile yarn such as a cotton, silk, or other fiber thread and which is used in the same manner as other textile strands are used for the fabrication of woven, knitted, twisted, etc., materials and objects.

Glass fibers have been found to possess many highly desirable characteristics for use as textile products. In particular their great tensile strength makes them ideal for use where strength is important. The strands and fibers cannot burn and they possess a high gloss, both of which suit them for uses such as curtains and decorative fabrics such as draperies. The materials are long lasting and because the surface of the glass fibers is impervious to water, materials woven or knitted from glass fiber strands can be readily washed by merely dipping in dirt dissolving or loosening solutions. Because the water or other liquid medium does not penetrate the fibers they dry very rapidly.

Glass fibers, however, have one characteristic which makes them slightly less desirable than other fibers for some uses. When the glass fibers work against each other, one glass fiber very quickly abrades another glass fiber and if the fibers are repeatedly worked against each other a broken strand will develop which may lead to a hole in the fabric.

It is, therefore, the principal object of this invention to provide a method for protecting the glass fibers from each other by cushioning each from its neighbors so that the abrasive effect of glass against glass sharply is reduced.

It is a further object of this invention to provide a method for coating glass fibers during their formation into strands with very fine cushioning means carried in a binding material so as to coat each individual fiber with a very thin mass of cushioning substance thereby to protect each fiber from its neighbors without destroying the strength or beauty of the fibers.

More specific objects and advantages will be apparent from the drawings which illustrate an apparatus designed for carrying out the method of the invention.

Figure 1:
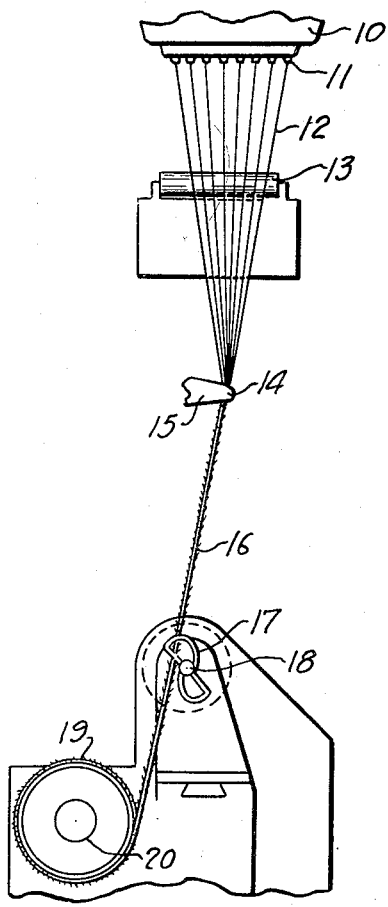
Fig. 1 is a somewhat diagrammatic view in elevation of apparatus on which the method of the invention may be carried out.

Glass fibers to be treated in accordance with the method of the invention are formed by being pulled from a stream of molten glass flowing from a body of the glass contained in a tank 10. The streams flow through minute orifices in a bushing 11. The fibers 12 are led over a roller 13 and then through an orifice 14 in a guide 15 which is so located as to bring the fibers together in the form of a grouped strand 16. The strand 16 is then led over a pair of curved leaders 17 on a rotating traversing unit 18 and thence onto a rotating spool 19 mounted on a spindle 20. The rotating traversing unit 18 does not constitute a part of the instant invention, being fully disclosed and claimed in Beach Patent 2,391,870 issued January 1, 1946.

Figure 2:
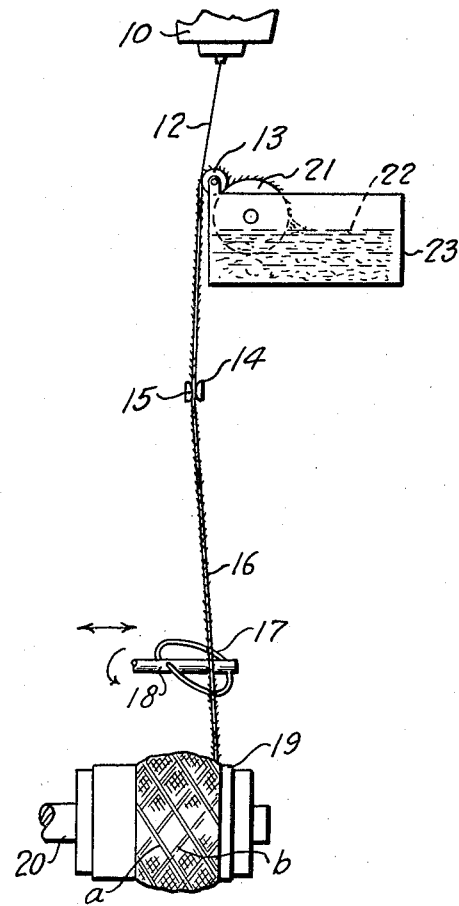
Fig. 2 is a side view of the apparatus shown in Fig. 1.

The traversing unit 18 serves to feed the strand 16 back and forth across the surface of the rotary spool 19 to lay up the turns of strands at sharp angles to previously laid up turns of strand as can be seen by reference to the two strands $a$ and $b$ in Fig. 2. After a substantial length of strand has been wound up on the spool 19 it assumes the form generally shown in Fig. 2. The spindle 20 is then stopped, the strand 16 is then laid on a new spool 19 on a second spindle 20 and the spool with its quantity of strands serves as a package for subsequent textile operations.

In the method according to the invention the roller 13 is peripherally engaged with a transfer roller 21 which is mounted to dip its surface into a pool of bulking and cushioning slurry contained in a tank 23. The nature of the cushioning means and of the carrier in the slurry 22 are such that the carrier has sufficient fluidity to permit its transfer by means of rollers 21 and 13 and sufficient viscosity to carry the cushioning means with it.

The cushioning means to be added to the continuous glass fibers may be of two general types, fibers and bubbles and each may be carried in several types of slurries or suspensions. I have found that if cellulose fibers, for example, are beaten very thoroughly and ground up to very fine sizes, they can be dispersed through a liquid carrier, for example water, as a very fine suspension and will remain in a uniformly suspended condition for long periods of time. If such a suspension of very fine fibers is employed in practicing the instant invention it is not necessary also to employ an adhesive in the liquid. The short fibers upon being transferred to the long glass fibers form a mat in which the short particulate fibers interlock with each other around the surface of the continuous fibers. This effect is much like that encountered in the manufacture of paper where the beaten wood pulp fibers are spread into a thin layer and, during drying, assume integrity of structure. Under some conditions, however, it may be desirable to add an adhesive even when the fibers are thoroughly beaten in the manner described and if an adhesive is used it should be relatively light and thin and reasonably quick drying.

Under other circumstances where the fibers employed are not susceptible to the thorough beating and hydrating described above with respect to cellulose fibers, the carrier in the slurry preferably should comprise an adhesive which remains in liquid form at approximately room temperature and which, when exposed to the air, dries relatively quickly adhering the small particulate fibers carried by the liquid onto the individual glass fibers 12. For examples, the liquid material may be a water solution of starch or it may be a solution of a water-soluble resin such as hydroxy methyl cellulose. It may be desirable for some of the fibers used to employ solutions of bone glue or wax emulsions or in other cases the slurry may be formed of a carrier consisting of latex.

The purpose of the liquid carrier, as explained, is to carry the particulate fibers forming the slurry onto the individual continuous glass fibers and then to adhere the particulate fibers to the glass fibers.

The nature of the particulate fibers used is not critical, it being necessary merely that they be very fine, preferably much finer but at least not much greater in diameter than the diameters of the individual glass fibers to which they are to be adhered. They should be sufficiently broken up such that their lengths are but a few times as great as their diameters. Fibers suitable for use in connection with this invention may include a wide variety of different types. For example, fine asbestos fibers have been found useful. Finely ground cellulose fibers such as wood pulp or refined alpha-cellulose have been found to possess the necessary characteristics for being carried onto the particulate fibers in the slurry and adhering in the several adhesives mentioned to protect the continuous glass fibers. Some success has been achieved with the use of finely ground Paligorskite sometimes called "mountain leather," a natural asbestos type material existing in fine crystalline form and comprising for the most part silicon dioxide.

Although the precise lengths and diameters of the particulate fibers employed are not highly critical, certain maximums appear necessary in order to provide satisfactory bulking fibers for use in the manner described. In general, the fibers to be employed may be ground in a conventional abrasive disk mill or beaten in an ordinary paper beater, for examples, until the pulp dispersion has a "freeness" of at least as low as say, zero and not more than ten. "Freeness" is the measure of hydration of the fibers, calculated on an arbitrary scale of from 0 to 100, where lesser numbers indicate greater "freeness," in accordance with the Schopper-Riegler apparatus as described in the Paper Trade Journal, volume 82, page 58, 1926; the scale being in accordance with Tentative Method 414, 1940 of the Paper Institute, Appleton, Wisconsin. More recent studies have revealed that the original "0" point, is no longer low enough and "freeness" indications now go below zero.

Although greater concentrations may be used, dispersions of about 3% by weight of fibers, such as highly hydrated kraft pulp in a liquid carrier comprising, say, 2 to 5% adhesive, have been found effective.

A concentration such as this will result in the presence of from one to several million soft cellulose fibrous particles per cubic centimeter of the dispersion. Several times as many particles up to, say, 30,000,000 per cubic centimeter, may be present where fibers from harder woods are employed.

Not only may organic, inorganic and refined natural fibers different from glass fibers be employed for bulking up the continuous glass fibers in the strands, but short particulate glass fibers ranging from two to fifteen hundred thousandths of an inch in diameter and from about one ten thousandth to two or three thousandths of an inch long may also be employed for this purpose.

The carrier employed to form the slurry with, for example, short glass fibers spreads a thin coating over each of the particulate fibers and rather thoroughly coats the continuous glass fibers as well and the coating itself in addition to the particulate fibers adhering to the continuous fibers forms a protective agent between the glass of both the continuous and the particulate fibers.

The precise nature of the carrier and of the fibers making up the slurry is not critical as has been explained but some attention must be paid to the viscosity which must be low enough to carry the fibers and yet high enough to spread the carrier thoroughly over the surface of the continuous fibers and the fibers themselves in the slurry must be so short as to not entangle the fibers making up the strands.

It may be found advisable to constantly agitate the slurry in order to prevent the fibers from matting together or from choking up the space between the two transfer rollers 21 and 13, for example, which might occur if a concentrated mass of fibers were lifted over the transfer roller 21 and packed into the space between the rollers. It may be desirable in using some types of liquids and fibers to control the temperature and humidity of the zone immediately surrounding the tank in order to prevent the fibers and slurry from setting up either on the tank surface or on the surfaces of the transfer rollers. In other instances it may be desirable to pass the coated strands through a heating or drying zone in order to more rapidly set up the coating material carrying the bulking fibers.

As mentioned earlier, the cushioning means may be in the form not only of fibers but also in the form of "bubbles" which may be created in the adhesive and/or liquid making up the carrier in the slurry or solution. The cushioning of the glass fibers one from the other may be achieved not only by the coating of each of the fibers with the short particulate fibers in the method already described, but it may also be achieved by the practice of a method which causes the development of a very large number of bubbles of microscopic size in the liquid carrier and thus around the individual glass fibers. If this way of producing the cushioning means is employed, the actual technique used may be any one of several, its purpose being to create the microscopically fine bubbles in such a way that they will be carried over with the liquid and then the coating on the individual fibers will be generally spongy in its characteristic nature.

The microscopic bubbles may be produced in several manners. For example, the binder or carrying composition can be subjected to high temperature or electrical and chemical treatment in such a manner as to cause the release of gases from elements in the binder or carrying liquid or the binder or carrier may already have the microscopic bubbles in it when placed in the coating tank.

The gas bubbles may be formed or liberated within the slurry or after the liquid or binding composition is transferred to the glass fibers.

As an example and not intended to limit the methods for forming the glass binders, a small proportion by weight of calcium carbonate may be added to the dispersion and may be carried along with the carrier onto the glass fibers. The glass fibers after their formation into strands and drying may then be treated with an acid solution which permeates into the binder and evolves carbon dioxide as small microscopic bubbles, the bubbles remaining entrapped in the coating composition and forming cushioning around the fibers. The calcium carbonate may be evolved into bubbles in the slurry prior to coating on the glass fibers or the gas may be dissolved in the slurry and the bubbles freed by heat treatment or supersonic vibration. The emulsification of air in the liquid in which the pulp is dispersed is also an excellent method.

Many different types of well-known gas forming substances may be employed and depending upon the particular characteristics of each substance, may be liberated in the slurry or after the fibers are coated. For a more complete and thorough discussion of this method of release of microscopically fine bubbles, my copending application Serial No. 184,355 filed September 12, 1950, may be consulted.

Coating admixtures comprising both microscopic bubbles and microscopic particulate fibers may also be employed where greater cushioning effect is desired, for example, in coating substances where the intermatting of the fiber is deemed advisable, both to coagulate the coating mixture on the glass fibers and to serve as spacing means for the coating fibers. In a case where the two are used together each may be prepared in accordance with the above described procedures and the two may either exist simultaneously in the coating admixture or the fibers may be dispersed throughout the coating admixture with a substance capable of releasing gases and the gases not actually evolved into bubbles until after the admixture is coated on the fibers.

Where the combination of microscopic bubbles and, for example, infinitely fine cellulose fibers is employed, a particularly good cushioning means is produced. For example, if cellulose fibers beaten to the degree of "freeness" discussed above are suspended in water in the order of a 3% solid dispersion and a gaseous agent is added, or air is emulsified into the water, the action of the bubbles and the microscopically fine fibers is such that large numbers of small "bird's-nests" are formed. These "bird's-nests" are small intermatted, randomly dispersed spheres of the short fibers formed around the surfaces of the small bubbles. If the bubbles are created in a carrier having a body as, for example, a resin or rubber solution, the bubbles retain their integrity and bind the fibers in the spherical masses with the fibers arranged on the surfaces of the bubbles. If water is employed, then when the water dries, the small spherical masses of fibers are left with hollow interiors and the "bird's-nests" thus formed are highly resilient, the voids in the centers serving to more greatly space the fibers than would otherwise be the case. This further bulks up the glass fiber strands to which these "bird's-nests" adhere by intermatting of their fluffy exteriors without increase in number of the fibers or weight of material used. For some purposes this combination method employing air bubbles in water with cellulose fibers has been found to produce the best results.

Thus by employing either the microscopic bubbles briefly described or the microscopic sized fibers, a protective cushioning coating is carried onto each of the glass fibers and incorporated between such fibers in the attenuated glass fiber strand, the result being a superior strand with each of the 200 or more fibers in the strand coated by a microscopically fine layer of spongy cushioning material and thus protected to a large extent from the abrasive action of neighboring fibers.

Although the coating material carrying the bulking fibers may not be completely set up before the bulking strand is wound onto the spool 19, because the traversing unit crosses successively laid loops at sharp angles, any adhesion between the strands in the package will be minimized.

Having described a preferred mode of practicing my invention, I claim:

1. A method for protecting the fibers in a continuous glass fiber strand that consists in coating each individual fiber with a material comprising a slurry of microscopic, discrete cushioning means and an adhesive in a liquid carrier, and thereafter associating the coated individual fibers in groups of appropriate number to form a strand.

2. The method in accordance with claim 1 in which the microscopic cushioning means consists of particulate fibers numbering from 1 to several million per cubic centimeter of slurry.

3. The method in accordance with claim 1 in which the microscopic cushioning means consists of hydrated cellulosic fibers having a "freeness" of between at least as low as zero and not more than ten.

4. The method in accordance with claim 1 in which the cushioning means consists of microscopically fine gaseous bubbles dispersed throughout and entrapped within the liquid carrier.

5. A method of producing continuous glass fiber strands that is characterized by the step of coating the individual glass fibers to be associated into a strand with an adhesive and particulate fiber admixture prior to association of the fibers to form the strand.

6. The method according to claim 5 in which the particulate fibers are carried in a liquid admixture comprising a water soluble adhesive that is liquid at normal temperatures.

7. A method of producing continuous glass fiber strands that is characterized by the step of coating the individual glass fibers prior to their association into a strand with a liquid coating material comprising an adhesive material and a substance capable of releasing microscopic gas bubbles, and subsequently treating the strand to release the gas bubbles within the adhesive material.

8. A method for protecting the fibers in a continuous glass fiber strand that consists in coating each individual fiber with a material comprising a slurry of particulate fibers in a liquid carrier, and associating the coated individual fibers in groups of appropriate number to form a strand.

9. A method for protecting continuous glass fibers in a strand that consists in dispersing microscopically fine cellulose fibers in a liquid carrier, coating the exterior surfaces of the glass fiber strands with such carrier and creating microscopically fine gaseous bubbles in the carrier whereby the microscopic fibers intermat in hollow spherical forms around the bubbles, and associating the individual coated fibers in groups of appropriate numbers to form a strand.

References Cited in the file of this patent

UNITED STATES PATENTS

| | | |
|---|---|---|
| 2,234,986 | Slayter et al. | Mar. 18, 1941 |
| 2,392,805 | Biefeld | Jan. 15, 1946 |
| 2,428,654 | Collins | Oct. 7, 1947 |
| 2,531,571 | Hyde | Nov. 28, 1950 |